8863X
J. J. HEINTZELMAN.
TRUSS.
Patented June 6, 1835.
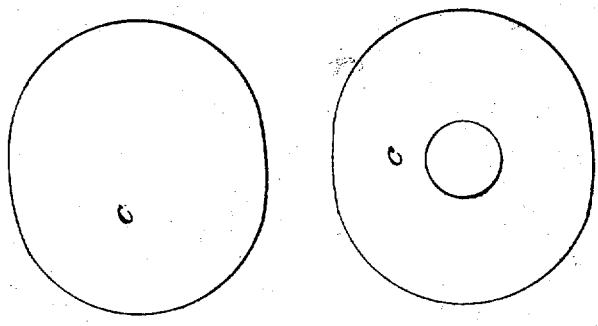
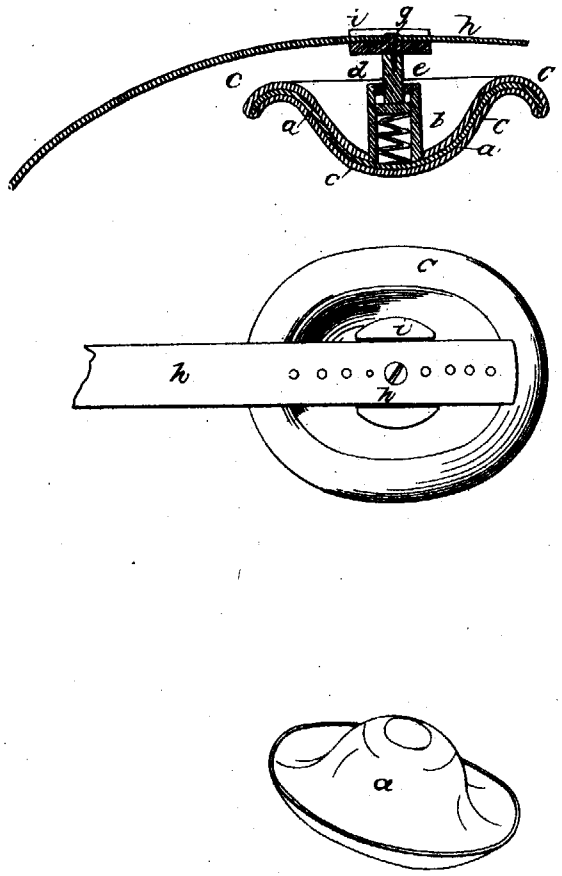
THE NORRIS PETERS CO., PHOTO-LITHO., WASHINGTON, D. C.

June 6 1835

8863X [illegible]
6/6/1835

John J. Heintzelman
Letters Patent

The schedule referred to in these Letters Patent and making part of the same containing a description in the words of the said Jno J. Heintzelman himself of his improvement in the Truss for the cure of Hernia.

---

To all to whom these presents shall come. Be it known that I John J. Heintzelman of the City and County of Philadelphia and State of Pennsylvania have invented a new and useful improvement in on the truss for the cure of hernia for which Letters Patent were granted to me on the 20th day of July 1831. and which I style Heintzelman's improved Truss Pad and that the following is a full and exact description of the construction and operation of the same as invented or improved by me. My improvement consists in the construction of the pad which is as follows. A circular or oval disk is made of strong tin, sheet copper, brass or other material possessing the same elasticity and firmness of say 2 inches diameter, a portion of the surface at the centre, about equal in diameter to half the diameter of the disk, is by means of dies, punches or any other convenient means punched up or raised so as form a spherical or spheroidal convexity towards the front, or that side of the disk which is to lie next to the patient, and a corresponding concavity on the other side or back, the remaining annular surface or ring is punched in a similar manner, concave on the front side & convex on the back. These inflexions may all be made at one operation by dies such as are in ordinary use. To the centre of the cavity in the back is secured by soldering a small hollow brass or metal cylinder say 3/4 of an inch in diameter and 1/4 of an inch long more or less, this cylinder is intended to receive the attachment which secure the pad to the bow or spring of the truss as hereinafter described. The metallic disk being thus formed I next take two [illegible] [illegible] or oval, (as the case may be) pieces of sheet caoutchouc or gum [illegible] of a size sufficient after being conformed with the concavities and convexities of the disk, to create all around on the outer circumference of
the latter an opening being also cut in the back piece for the protrusion
of the cylinder. the disk being now placed between these sheets they are
pressed closely in a pair of dies with cavities and convexities nearly corres-
ponding with the inflexions of the disk (except a depression for the cylinder)
and sufficiently larger to receive the additional thickness of the sheets
and to mould a full convex edge or ring beyond the angular cavity of
the front of the pad the dies having been previously heated to a proper
degree. by which means in a few minutes the edges of the gum elastic
sheets are firmly united together and the pad retaining the figure and
impress given by the dies, is ready for attaching to the bow, which is done
in the following manner. The cylinder hereinbefore mentioned is closed
by a circle head or plate having a hole in its centre and furnished with
a screw thread at its circumference which screws or takes into a corres-
ponding thread in the upper part of the cylinder. A strong metalic pin
or shaft passes through the hole in this plate, the part within the cyl-
inder having a broad circular head nearly of equal diameter with the
cylinder which rests or bears on a spiral steel spring dropped loosely in-
to the cylinder, the other end of the pin projecting about 1/8 of an inch
beyond the plate with a screw hole in its centre to receive the screw
which attaches the bow or spring of the truss as follows. The end of the
bow or spring which may be 1/2 an inch broad and thin as the required
degree of strength will permit being introduced into a slot or mor-
tice made in an oblong button or piece of brass, a screw is passed through
the button and spring which takes in the end of the pin above mention-
ed, and confines the whole together, the length of the slot allowing a
slight lateral motion to the bow, which in connection with the ac-
tion of the spiral spring upon which the head of the pin bears, forms
a sort of universal joint, and admits of an easy rolling motion of the
bow or pad without the latter being in the least displaced or its press-
ure abated. In the pad for femoral cases the attachment is the
same & only differs from the convex hair stuffed pad in common use
(stuffed with wool) by being formed of dies as herein described of a
metal metal disk covered with gum elastic, without stuffing. This Truss is
to be applied in the usual manner, the dimensions of the pad as
also the degree of its convexity being varied to suit the circumstances of
the case and the indications of the disease, the regulation of which is
therefore left to the judgment of the practitioner or the patient. Now
all that I have claim as my invention and improvement and for
which I ask Letters Patent is the mode of placing the metal disk
of the pad between the two sheets of caoutchouc [illegible] and united
as herein described and set forth instead of placing it as formerly behind
them, and dispensing with a covering of silk, leather, or any other sub-
stance whatsoever, thereby rendering the pad more elastic, more
simple and durable, and perfectly easy to be cleansed without
injury. In testimony that the foregoing is a true specification
of my said improvement, I have hereunto set my hand at the City
of Washington this 15th day of May 1835

Witnesses
Wm. T. Steiger
[illegible]

Jno. I. Heintzelman

[illegible]